United States Patent [19]

Matias et al.

[11] Patent Number: 4,910,772
[45] Date of Patent: Mar. 20, 1990

[54] VIDEO SCRAMBLING APPARATUS AND METHOD BASED ON SPACE FILLING CURVES

[75] Inventors: Yossi Matias, Herzlia; Adi Shamir, Rehovot, both of Israel

[73] Assignee: Yeda Research & Development Co. Ltd., Rehovot, Israel

[21] Appl. No.: 231,801

[22] Filed: Aug. 12, 1988

[30] Foreign Application Priority Data

Aug. 16, 1987 [IL] Israel ........................................ 83549

[51] Int. Cl.⁴ .............................................. H04L 9/00
[52] U.S. Cl. ...................................... 380/20; 380/11; 380/14
[58] Field of Search ................ 380/11, 14, 20; 382/41

[56] References Cited

U.S. PATENT DOCUMENTS

| | | | |
|---|---|---|---|
| 4,070,693 | 1/1978 | Shutterley | 380/14 |
| 4,405,942 | 9/1983 | Block et al. | 380/14 |
| 4,575,754 | 4/1986 | Bar-Zohar | 380/11 |
| 4,594,609 | 7/1986 | Romao et al. | 380/11 |
| 4,604,650 | 8/1986 | DelCoco et al. | 380/14 |
| 4,605,961 | 8/1986 | Frederiksen | 380/14 |
| 4,620,224 | 10/1986 | Lee et al. | 380/14 |
| 4,636,851 | 1/1987 | Drury et al. | 380/11 |
| 4,736,420 | 4/1988 | Katznelson et al. | 380/14 |
| 4,742,544 | 5/1988 | Kupnicki et al. | 380/14 |
| 4,807,298 | 2/1989 | Conte et al. | 382/41 |

FOREIGN PATENT DOCUMENTS

| | | |
|---|---|---|
| 123422 | 10/1984 | European Pat. Off. |
| 127383 | 12/1984 | European Pat. Off. |
| PCT/GB83/-00121 | 11/1983 | PCT Int'l Appl. |
| PCT/GE84/-0010 | 6/1984 | PCT Int'l Appl. |
| 1590579 | 6/1981 | United Kingdom |

OTHER PUBLICATIONS

R. Kupnicki et al., "High Security Television Transmission Using Digital Processing" IEEE Publication 84CH2069-3 (1984).
P. Moroney et al., "The Videocipher Scrambling System" IEEE Publication 84CH2069-3 (1984).
Mattias, Yossi, M. S. Thesis, CS Dept., The Weizmann Institute of Science, May 1987, pp. 12-16.

*Primary Examiner*—Salvatore Cangialosi
*Attorney, Agent, or Firm*—Sheldon & Mak

[57] ABSTRACT

A method of encrypting a video signal employing a pseudo-random Space Filling Curve having a highly irregular scanning pattern for scanning the pixel addresses of a video picture stored in a frame buffer. The method is used with a video scrambler/descrambler device and is characterized by a much higher cryptographic strength than existing techniques, which is not subject to simple correlation attacks by comparing and matching of line portions. In addition, the method features a reduction in the video signal bandwidth for typical pictures.

19 Claims, 6 Drawing Sheets

VIDEO SCRAMBLING APPARATUS AND METHOD BASED ON SPACE FILLING CURVES

FIELD OF THE INVENTION

The present invention relates to video scrambling techniques and devices, more particularly, to a video scrambling technique employing a pseudo-random Space Filling Curve for scrambling/descrambling a digital representation of a video signal before and after a video transmission procedure.

BACKGROUND OF THE INVENTION

Video scrambling techniques are known for use in home cable TV systems where it is desired to restrict programs to authorized viewer-subscribers, and also for use in military applications such as transmission of video signals from an airplane. In between these extremes are industrial applications such as video conferencing, videophone, two-way TV, etc.

The difficulty in encryption of a video signal is that the signal is analog, has a very high information rate, and re-ordering of analog video information in a line may adversely affect the signal and noise spectra seen at a receiver. With the advent of VLSI electronics technology which has become feasible only in the last few years, very quick digital storage methods became available using fast RAMs that can store and retrieve video information in real time in a frame buffer. This led to the possibility of scrambling the video signals by digital methods, leaving the transmission format intact.

Examples of these digital methods include line reversal, line position modulation, line segment swapping, and line dispersal, all of which are described in a paper entitled "High Security Television Transmission Using Digital Processing", by R. Kupnicki et al., IEEE publication 84CH2069-3 (1984). This paper calls attention to the need to select an appropriate scrambling algorithm in order not to increase the bandwidth of the original video signal, so that a standard video receiver can be employed. Another similar technique involves line rotation and is described in U.S. Pat. No. 4,070,693 to Shutterly.

When these scrambling techniques are examined from the aspect of cryptographic strength, it is seen that correlation techniques make it possible to decode the schemes by comparing and matching lines or segments until the original arrangement of these lines or segments is found in order to recover a significant portion of the entire picture.

An additional digital method of scrambling a video signal calls for random permutation of the pixels in a line, as described in British patent 1,590,579 to Taylor. Again, it is stated that the nature of a video scrambler is to destroy the relationship between adjacent picture points, resulting in a requirement for a higher transmission bandwidth for the video signal. Otherwise, distortion of the picture makes the technique ineffective.

One very common video scrambling technique is provided by a system known by the trademark VideoCipher, as made available by M/A-COM Linkabit, Inc., and described in a paper entitled "The VideoCipher Scrambling System" by P. Mulroney et al., IEEE publication 84CH2069-3 (1984). This system is also described in European patent application number 84303322.6, and is based on permutations of portions of video information lines. The number of possible permutations is very high, but since the line portions are long, the number of jumps within the video signal is kept low and so the bandwidth increase is insignificant.

However, the long line portions make for easier correlation attacks on the scrambling algorithm by comparing and matching line portions.

Therefore, it would be desireable to provide a video scrambling technique which has a higher cryptographic strength and operates within the standard video signal bandwidth.

SUMMARY OF THE INVENTION

Accordingly, it is a principal object of the present invention to provide a method of encrypting a video signal employing a pseudo-random Space Filling Curve having a highly irregular scanning pattern for scanning the pixel addresses of a video picture stored in a frame buffer. The method is used with a video scrambler/descrambler device and is characterized by a much higher cryptographic strength than existing techniques, which is not subject to simple correlation attacks by comparing and matching of line portions. In addition, the method features a reduction in the video signal bandwidth for typical pictures.

In accordance with a preferred embodiment of the invention, there is provided a method of encrypting a video signal comprising the steps of:

storing in the locations of a frame buffer the pixel values of a group of video information lines representing at least a portion of a video picture contained in the video signal;

defining a pseudo-random Space Filling Curve providing a sequence corresponding to locations of the frame buffer mapping random vertical and horizontal directions of movement between substantially all adjacent pixels of the video picture portion; and addressing the locations of the frame buffer in accordance with the defined sequence to read the pixel values thereof for transmission of the video signal in encrypted fashion.

In the preferred embodiment, the inventive method is applied in the operation of a video scrambler which uses the frame buffer to store a grid graph representation of the horizontally and vertically adjacent pixels in a video picture. A Space Filling Curve (SFC) is defined as a Hamiltonian path which visits each pixel exactly once. The SFC is generated by the scrambler to exploit the two-dimensional nature of the video picture representing the original source of the video signal. The use of a pseudo-random SFC to define the sequence in which frame buffer addresses are read provides a highly irregular scanning pattern of the adjacent pixels in the video picture since there are enormous possibilities of irregular paths based on horizontal and vertical motion between them.

The encryption provided by the video scrambler in the transmission of the video signal is decoded by the descrambler. By using a shared key stream between both the scrambler and the descrambler, the latter generates the same pseudo-random Space Filling Curve as is used in the scrambler, thereby providing it with access to the correct locations of the frame buffer for restoring the original video signal.

The pseudo-random SFC is generated by each execution of an algorithm whose output is in the domain of a family of Hamiltonian paths in the rectangular grid graph provided by the frame buffer. Once the SFC is chosen from the Hamiltonian path family, it is used to define the sequence in which the frame buffer addresses are read. After a predetermined period of time, the original SFC is replaced by another one from the Hamiltonian family, further increasing the security of the encryption method.

A feature of the inventive method is that the bandwidth of the video signal is usually reduced with typical pictures since the SFC provides a scanning pattern which preserves the correlation between adjacent pixels. The broken lines of vertical and horizontal movement which characterize the SFC make it a more "local" scanning pattern than a conventional raster scan for a group of sequential frame buffer locations. This reduces the amount of pixel-to-pixel change in values, allowing for the reduced bandwidth.

An alternative embodiment of the invention is the transmission of the SFC so that the descrambler does not have to generate it, with the transmission being accomplished along with the video signal.

In still another embodiment, several SFC's can be stored in the descrambler in advance of its operation, with the appropriate SFC (which has been used in the scrambler) being selected in accordance with an encrypted signal included in the transmission.

Another feature of the invention is the application of the SFC to a sequence of consecutive frames in the video picture. Storage of the video information in sequential frame stores allows a three-dimensional SFC to be used since the sequence of possible locations is contained within a cubic grid built by the consecutive video frames. This further increases the security of the encryption method while further reducing the bandwidth of the signal due to the 3-D locality of the scan.

Other features and advantages of the encryption method according to the present invention will become apparent from the drawings and the description contained hereinbelow.

BRIEF DESCRIPTION OF THE DRAWINGS AND APPENDICES

For a better understanding of the invention with regard to the embodiments thereof, reference is made to the accompanying drawings and appendices, in which like drawing numerals designate corresponding elements throughout, and in which.

Figure 3:
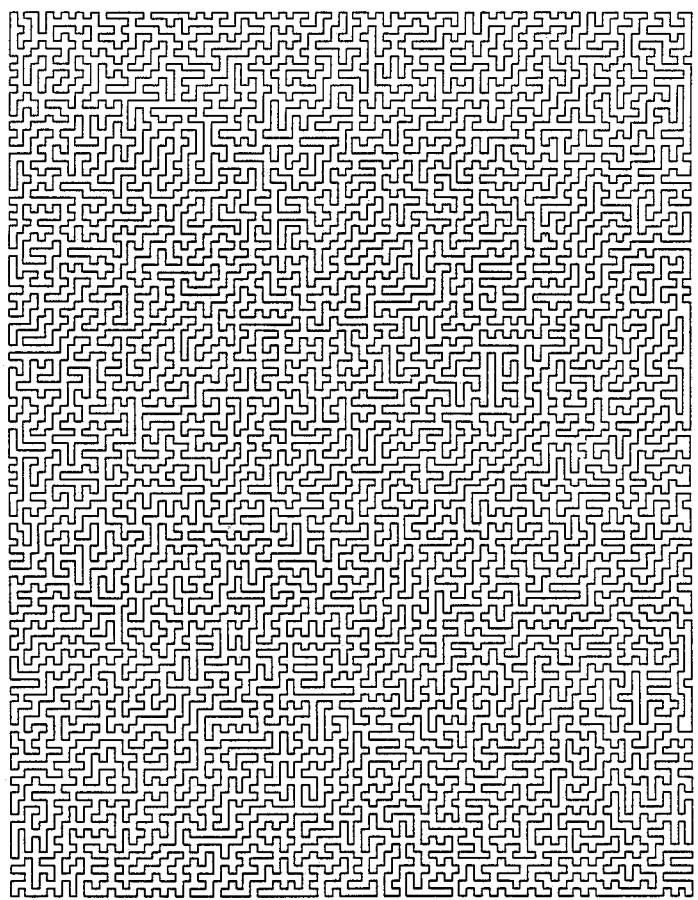
FIG. 3 is a sample of a Space Filling Curve generated in accordance with the inventive method as shown in FIG. 2.
Figure 9:
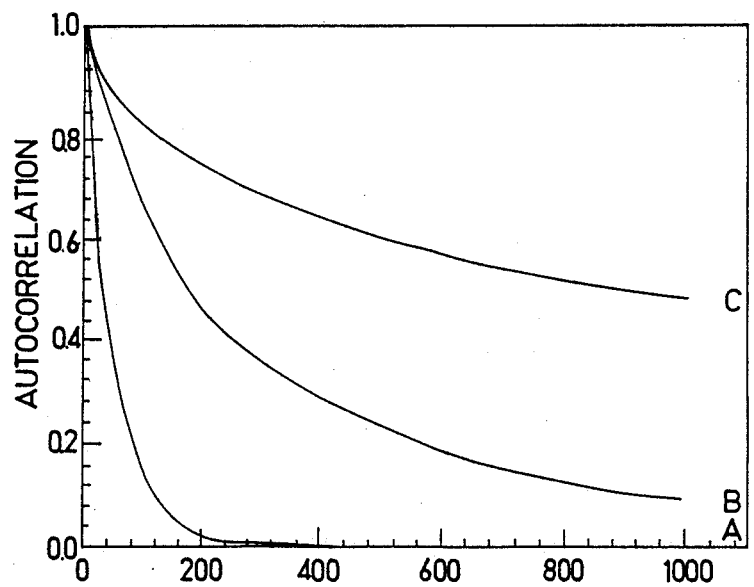

FIGS. 8a–d show four possible cubic circuits for use with a 3-dimensional SFC per the method of the invention;

FIG. 9 shows a comparison of the autocorrelation functions of the 2 and 3-dimensional SFC's with the conventional raster scan;

Appendix pages A1–A2 represent an algorithm for generating the Space Filling Curve of FIG. 3; and Appendix pages A3–A16 represent a listing of the SFC-generating algorithm suitable for coding as a computer program.

DETAILED DESCRIPTION OF A PREFERRED EMBODIMENT

Figure 1:
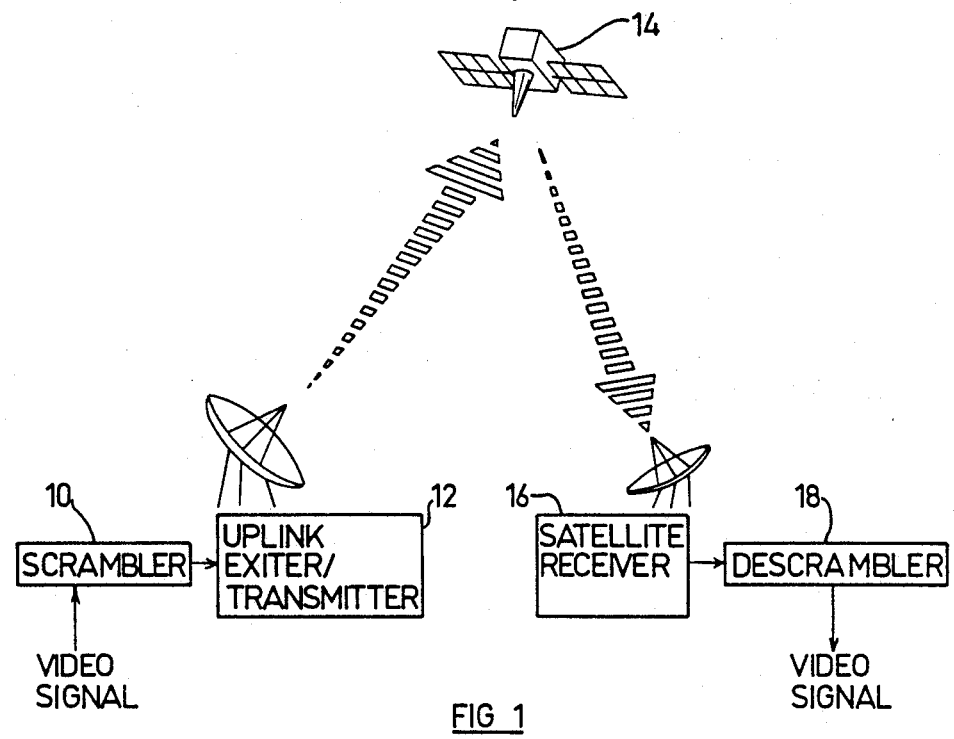
FIG. 1 is an overall block diagram of a direct broadcast satellite system incorporating the encryption method of the present invention in a preferred embodiment.

Referring now to FIG. 1, there is shown an overall block diagram of a direct broadcast satellite system incorporaing the method of the present invention in a preferred embodiment. The need to securely transmit the video information in these types of systems is shared by many applications, including TVRO (TV receive only) stations in cable TV networks, videoconferencing, videophone, analog facsimile and military communication systems. As is further described herein, the present invention provides a method which is cryptographically much stronger than existing methods of scrambling the video information.

In the system of FIG. 1, a scrambler 10 receives a standard video signal for encryption and transmission via an uplink transmitter 12 to a communications satellite 14. Reception of the transmission is provided by satellite receiver 16, and descrambler 18 decodes the encrypted video signal to restore it to its original form as output. The input and output of the scrambler 10 and the descrambler 18 are both video signals normally in a standard format, thus full compatibility is achieved.

In performing the encryption method of the invention, the scrambler 10 interferes only with the order of the video signal content and not with the signal's form. The scrambler 10 and descrambler 18 are modules that are added onto an existing system while other components remain unchanged. In practice, the descrambler is envisioned as a "black box" that is located between the TV set and the cable input of the video signal, which usually comes from a receive-only antenna. Cables or telephone lines may replace the satellite communications link.

Figure 2:
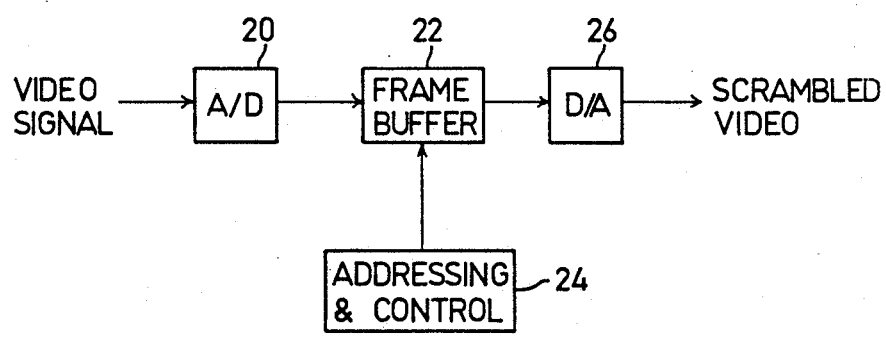
FIG. 2 is a system block diagram illustrating the encryption method of the present invention as used in the system of FIG. 1.

Referring now to FIG. 2, there is shown a system block diagram illustrating the encryption method of the present invention as used in the scrambler 10 of FIG. 1. The encryption method is based on a reordering of the transmitted pixels in the video signal. An A/D converter 20 converts the video signal input into a digital sequence, and the video signal information is then fed to frame buffer 22 for storage in raster scan format. An addressing and control computer 24 controls the order in which the pixels are retrieved from the frame buffer 22. A D/A converter 26 converts the reordered digital sequence back into an analog video signal, which has been scrambled, and the scrambled video is prepared for transmission by uplink transmitter 12 or other transmission station.

In accordance with the encryption method of the present invention, the scrambled video signal provided by scrambler 10 must meet seemingly contradictory requirements. On the one hand, it must have a certain randomness so as to survive correlation-based attacks, while on the other hand, its smoothness must remain unaffected so that the bandwidth is not increased, requiring an autocorrelation function that is equal to or even higher than that of the original raster scan.

As is well known, a conventional raster scan involves scanning of pixels in a frame from top to bottom and from left to right. The inventive method is based on pixel permutation by changing the scanning order without changing the pixel's values. For this purpose, the frame buffer 22 is used to store a grid graph representation of the horizontally and vertically adjacent pixels in a video picture. Since it is desired to preserve the correlation between adjacent pixels, a scanning pattern is chosen which is a connected curve, denoted as a Space Filling Curve (SFC). This type of curve exploits the two-dimensional nature of the video picture by making use of the similarity of the vertical autocorrelation between pixels to the horizontal autocorrelation. The scanning pattern is provided by the addressing and control computer 24 which reorders the retrieval of the digital sequence in frame buffer 22.

Referring now to FIG. 3, there is shown a Space Filling Curve (SFC) which provides the inventive method with a scanning pattern that makes possible vertical advances between pixels on different horizontal video lines. Since the scan is to be continuous in the picture, i.e., adjacent pixels in the scan are also adjacent in the picture, the scrambled video signal will remain smooth. The Space Filling Curve is a Hamiltonian path which visits all the pixels in the picture and does not intersect itself, so that there are no jumps in the scan nor any second transmission of the same pixel. The use of a pseudo-random SFC to define the sequence in which frame buffer addresses are read provides a highly irregular scanning pattern of the adjacent pixels in the video picture since there are enormous possibilities of irregular paths based on horizontal and vertical motion between them.

In accordance with the present invention, the encryption method chooses the SFC in a pseudo-random fashion, and then uses the SFC as the scanning pattern for reordering the retrieval of the pixel sequence in the frame buffer 22. The choice of SFC's is based on execution of an algorithm which efficiently generates an SFC out of a family of Hamiltonian paths in accordance with a mathematical treatment of the geometry of a representation of the video picture, which is now presented.

Let G be the infinite graph whose vertex set consists of all points of the plane with integer coordinates and in which two vertices are connected if and only if the (Euclidean) distance between them is 1. A grid graph is a vertex induced subgraph of G. Let $v_x$ and $v_y$ be the coordinates of the vertex v. A rectangular grid graph R(m, n) is a grid graph whose vertex set is $\{v: 1 \leq v_x \leq m$ and $1 \leq v_y \leq n\}$. Therefore, if frame buffer 22 is considered as a rectangular grid graph R(m, n) whose vertices are pixels, the SFC is a Hamiltonian path in R(m, n).

The problem of finding Hamiltonian paths between specified pairs of vertices in rectangular grid graphs was examined in the paper entitled "Hamiltonian Paths in Grid Graphs", A. Itai et al., Siam J. Computers (1982), wherein it was shown how to construct one such path. In accordance with the present invention, many such paths are efficiently generated. For additional discussion of the area of graph algorithm theory, refer to the text entitled "Algorithmic Combinatorics", S. Even, Macmillan & Co., New York (1973).

An algorithm which efficiently generates all the Hamiltonian and "almost" Hamiltonian paths of the rectangular grid graph R(m, n) is denoted the Ham+ algorithm, and is attached as an appendix to this specification. The algorithm appears therein in a form suitable for coding in the Pascal programming language.

To understand the algorithm, certain definitions are required. First, degree (v) is defined to be the number of v's neighbors that were already chosen in the algorithm. Second, vertices $v_1$ and $v_2$ are defined to be partners if they are (at the moment) the endpoints of the same path. In a certan row, let $v_1$ be the leftmost vertex v such that degree(v) <2 and let $v_r$ be the rightmost vertex v such that degree(v) <2. If there is no vertex with degree <2, there is considered to be no $v_r$. Considering a vertex v, let right(v), left(v), below (v) and above(v) be the vertices on its left, on its right, below it and above it, respectively. When considering a vertex, $v_{ij}$, the meaning is "the vertex in the i'th row and the j'th column."

For the sake of simplicity, it is assumed that after each step in the algorithm, the variables $v_1$, $v_r$, degree(v) and partner(v) for all v in the certain row being treated are as defined above. The justification for this assumption is that updating these variables can be done in a small constant number of steps as shown below. The terms "choose the neighbor" and "connect vertices" are used interchangeably, and the specific vertices will be clear from the context.

The following updating rules will be applied:
1. Initially every vertex is the partner of itself and has a degree 0.
2. Initially $v_1$ and $v_r$ of each row are the leftmost and the rightmost vertices in the row.
3. After connecting $v_1$ and $v_2$:
   (a) partner ($v_1$) and partner($v_2$) become partners.
   (b) degree($v_1$) and degree($v_2$) are increased by 1.
   (c) if $v_1$ was $v_1$ then the new $v_1$ is right($v_1$) or right (right($v_1$)), according to degree(right($v_1$)) (<2 or =2, respectively).
   (d) if $v_r$ was $v_1$ then the new $v_r$ is left($v_1$) or left-(left($v_1$)), according to degree(left($v_1$)) (<2 or =2, respectively).

Note that in step 3(c) degree(right($v_1$))=2 exactly when $v_2$=right ($v_1$) and degree($v_2$) was 1 before it was connected with $v_1$. In this case $v_1$=right($v_2$) since degree(right($v_2$))<2. Similarly, in step 3(d) degree(left($v_1$))=2 exactly when $v_2$=left($v_1$) and degree($v_2$) was 1 before it was connected with $v_1$.

Note also that if $v_{last}$ (as determined in step 2 of algorithm Ham+ shown in appendix page A1) is either $v_1$ or $v_2$, then all vertices in the row have degree 2 and there is no $v_r$.

Algorithm Ham+ constructs the "almost" Hamiltonian circuit by scanning the rows of the frame buffer 22 from top to bottom. A convention that may be used is to enumerate the rows from top to bottom and the columns from left to right. After the (i−1)'th iteration of the algorithm, the rectangle R(i−1, n) is completely covered with disjoint paths whose endpoints are all in the i'th row. In the i'th iteration, the i'th row is filled by advancing the endpoints. No endpoint is left inside R(i, n) and no path becomes a circuit. This is accomplished by letting the endpoints of each path identify each other as partners. In the final two rows the paths are tied together in order to get a global circuit.

The result as illustrated in FIG. 3 is a pseudo-random SFC which is based on a set of directions of movement in the frame buffer 22. These movements can be denoted by the directions left, right, up or down. The sequence of directions left, right, up or down is all that is needed by the address control 24 to specify the movements. This sequence is what is provided by the SFC. It is estimated that for a video picture of 250×250 pixels, there exist $2^{34000}$ possible SFC's, which is an enormous number and prevents attacks on the system by exhaustive attempts or by comparing and matching line portions. The use of SFCs enables even a reduced size memory, for example containing 25×25 pixels, to be used. In such a case, there would exist $2^{300}$ possibles SFCs.

Other possibilities exist for the 2-dimensional SFC which include a scanning pattern allowing diagonal movements to form paths in a triangular or honeycomb grid graph. The principles of the Hamiltonian path will apply in these cases in accordance with suitable algorithms for achieving them. Alternatively, multiple continuous curves which together fill a required space may be employed.

Figure 4:
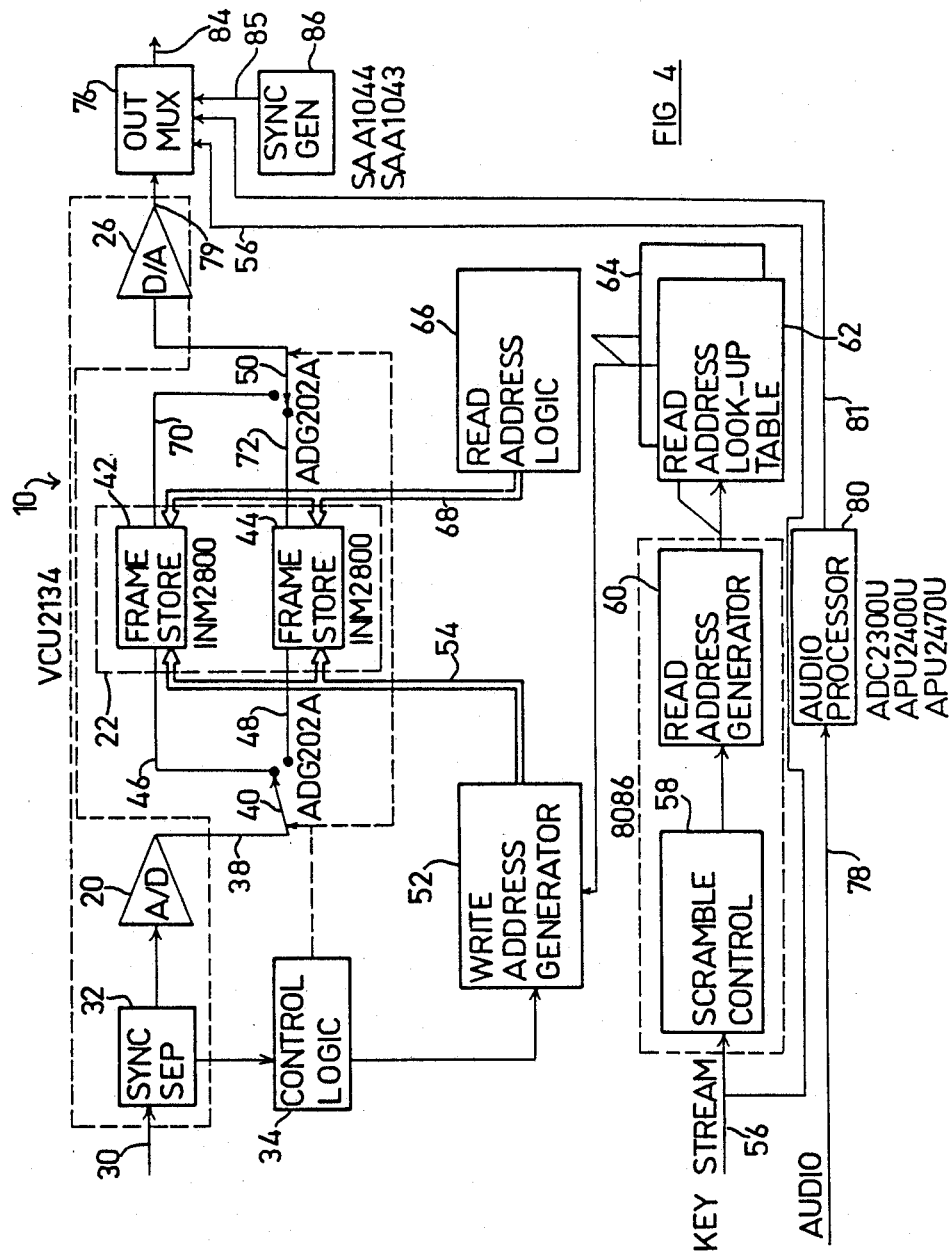
FIG. 4 is a schematic block diagram of a video scrambler employing the method of the present invention as shown in FIG. 2.

Referring now to FIG. 4, there is shown a schematic block diagram of a video scrambler 10 employing the method of the present invention. The scramber 10 is provided with a video signal 30 at sync separator 32 for detection of horizontal and vertical synchronization signals which are fed to control logic 34. After sync separation, video signal 30 is provided to A/D converter 20 for conversion to digital form. The digital video signal 38 is fed to frame switch 40 which controls the signal feed to one of frame stores 42 or 44 (forming frame buffer 22) via respective lines 46 or 48. The particular frame store is selected by control logic 34 for storage of either an odd or even field.

In the preferred embodiment, two frame stores 42 and 44 are used, which enables each to be slower than if only one frame store were used. This is because the video signal can be written into one while the other can be read, so that if the TV picture has 60 frames per second, each of frame stores 42 and 44 has 1/60 sec to complete its task of writing or reading out the video signal, in accordance with the operation of frame switch 40 and frame switch 50 on the output side.

It will be appreciated that an alternative embodiment could use more than two frame stores, each having still slower response than described above, without affecting the overall system response.

The two frame stores 42 and 44 are fast video RAMs each organized in a 256×256×8 bit matrix, for example, which are used to store incoming video on lines 46 and 48. All control signals and addresses are supplied to frame stores 42 and 44 by write address generator 52 under supervision of control logic 34 via control bus 54.

In accordance with the encryption method of the invention, a key stream signal 56 is provided to scramble control 58 for processing to generate pseudo-random space filling curves, using the Ham+ algorithm in the preferred embodiment. The key stream signal 56 may be provided as the output of a pseudo-random number generator which is started by a "seed" number. The output of scramble control 58 is a sequence of left, right, up, and down direction instructions (L, R, U, D) which are fed to read address generator 60. The direction instructions are converted by read address generatory 60 to physical addresses corresponding to those in frame stores 42 and 44. These physical addresses are stored in one of a pair of read address look-up tables 62 and 64. If more than two frames stores are provided, the number of read address loop-up tables is increased correspondingly.

In operation, when one of frame stores 42 and 44 is full and the other is switched to save the incoming video, the data from the first one is read out using addresses from the appropriate one of read address look-up tables 62 and 64. These addresses are supplied via read address logic 66 to address bus 68. The result is that the digital video signal is read out of frame stores 42 and 44 in a different order than it was written in, thus providing scrambled video signals 70 and 72 for switching out via operation of frame switch 50 as controlled by control logic 34.

The scrambled video signals 70 and 72 are fed to a D/A converter 26 for conversion to analog video signal 79 and are passed to output mixer 76 which also receives the key stream 56. The audio portion of video signal 78, which may also be encrypted by digitization and scrambling, is processed by audio processor 80 and passed as audio signal 81 to output mixer 76. Thus, the complete analog video signal output 84 is formed from analog video signal 79, key stream signal 56, audio signal 81 and sync signals 85 from sync generator 86.

Figure 5:
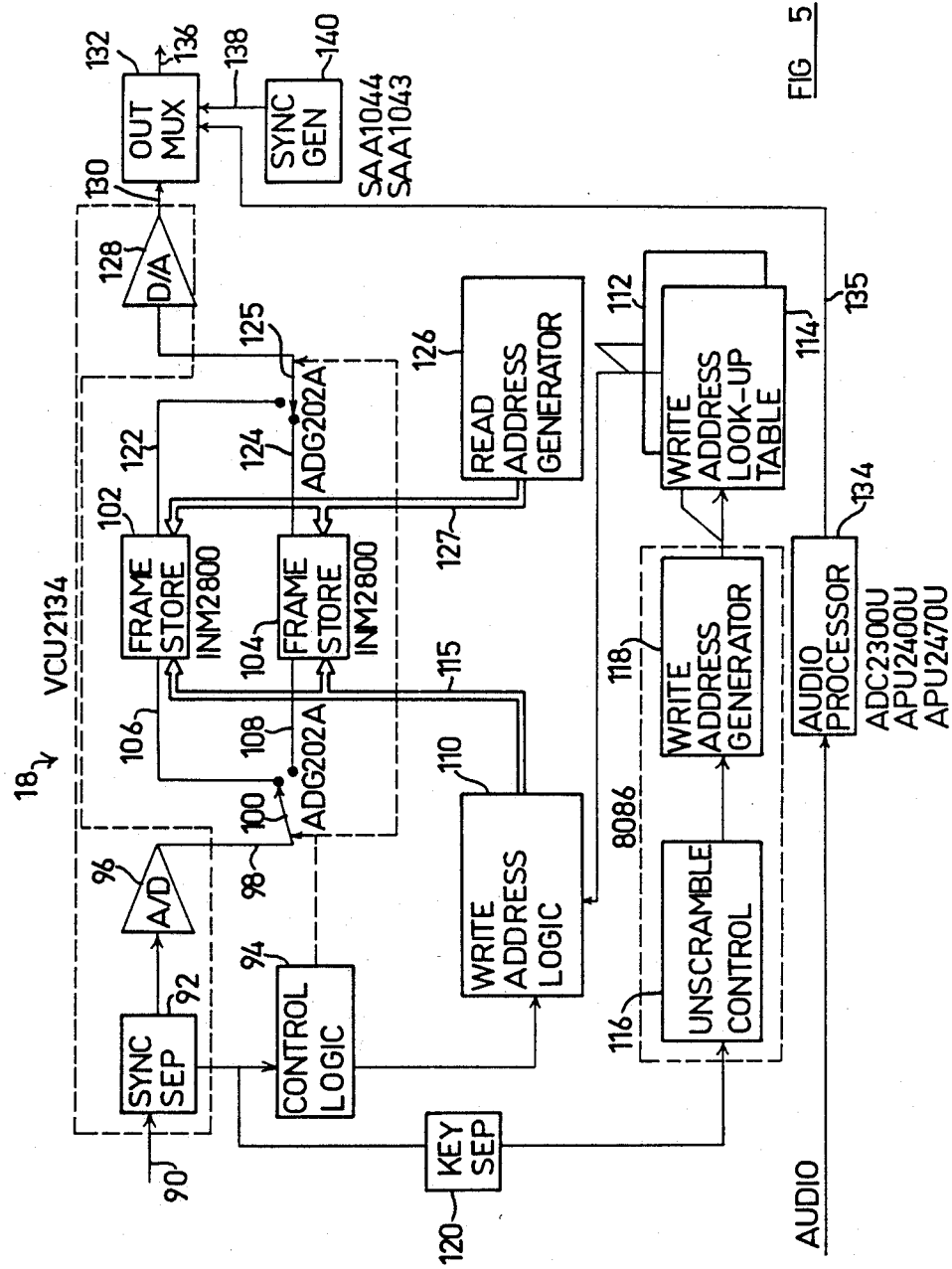
FIG. 5 is a schematic block diagram of a video descrambler employing the inventive method.

In FIG. 5, a schematic block diagram of the descrambler 18 is shown. The descrambler 18 is provided with a video signal 90 at sync separator 92 for detection of horizontal and vertical synchronization signals which are fed to control logic 94. After sync separation, video signal 90 is provided to A/D converter 96 for conversion to digital form. The digital vido signal 98 is fed to frame switch 100 which controls the signal feed to one of frame stores 102 or 104 via respective lines 106 or 108. The particular frame store is selected by control logic 94 for storage of either an odd or even field.

The two frame stores 102 and 104 are fast video RAMs each organized in a 256×256×8 bit matrix (same as in scrambler 10), for storing incoming video on lines 106 and 108. All control signals and addresses are supplied to frame stores 102 and 104 by write address logic 110 and write address look-up tables 112 and 114 under supervision of control logic 94 via control bus 115.

In accordance with the encryption method of the invention, the key stream signal 56 which was used in the scrambler 10 is provided to unscramble control 116 for processing to generate pseudo-random space filling curves, using the same Ham+ algorithm. The key stream signal may also be generated by a pseudo-random number generator having the same "seed" as used in the scrambler. In such a case the key stream need not be supplied to the mixer 76. Instead a synchronizing signal may be employed. The output of unscramble control 116 is a sequence of left, right, up, and down direction instructions (L, R, U, D) which are fed to write address generator 118. The direction instructions are converted by write address generator 118 to physical addresses corresponding to those in frame stores 102 and 104. These physical addresses are stored in one of the pair of write addess look-up tables 112 and 114.

In operation, the incoming video signal 90 has already been scrambled in the scrambler 10 by means of pixel reposition according to the SFC. In the descrambler, unit pixels are written into frame store 102 and 104 using addresses produced by the same algorithm employing the identical key stream signal 56 as used in the scrambler 10, with the key stream signal 56 being separated (or locally generated) in key separation unit 120. These addresses are supplied via write address look-up tables 112 and 114 to write addess logic 110 which feeds address bus 115. The result is that the digital video signal is written into each of frame stores 102 and 104 in the same order that it was read out in the scrambler 10, thus restoring the original picture. This provides descrambled video signals 122 and 124 which are retrieved in raster scan format by switching out via operation of frame switch 125 as controlled by control logic 94.

In response to read address generator 126 operation via address bus 127, the unscrambled video signals 122 and 124 are fed to a D/A converter 128 for conversion to analog video signal 130 and are passed to output mixer 132. The audio portion of video signal 90, which may require decoding if encrypted in scrambler 10, is processed by audio processor 134 and passed as audio signal 135 to output mixer 132. Thus, the complete analog video signal output 136 is formed from analog video signal 130, audio signal 135 and sync signals 138 from sync generator 140.

As shown in the preferred embodiment, key stream signal 56 is transmitted with the video signal. Since the inventive method incorporates an efficient algorithm for generating the SFC, this signal may be transmitted occasionally to begin the generation of another SFC and so increase the cryptographic strength of the system. The key stream signal 56 itself may be encrypted, or in an alternative embodiment, the key may be based on use of a "smart card" which carres a code number. In this arrangement, the descrambler combines use of the smart card with a transmitted "seed" number, which together generate a new key stream signal 56 via a pseudo-random number generator.

An alternative embodiment of the invention is the transmission of the SFC so that the descrambler 18 does not have to generate it, with the transmission being accomplished along with the video signal. In still another embodiment, several SFC's can be stored in the descrambler in advance of its operation, with the appropriate SFC (which has been used in the scrambler 10) being selected in accordance with an encrypted signal included in the transmission. The key stream signal 56 may be used for the purpose of selecting the appropriate SFC in the descrambler 18 or for encrypting the transmission of the SFC itself. These alternatives could reduce the descrambler cost.

As stated earlier, it is a particular feature of the inventive method is that the bandwidth of the video signal is usually reduced but certainly not increased for typical pictures. This is true since the SFC provides a scanning pattern which preserves the correlation between adjacent pixels. The broken lines of vertical and horizontal movement which characterize the SFC make it a "local" scanning pattern for a group of sequential frame buffer locations, and this reduces the amount of pixel-to-pixel change in values, allowing for the reduced bandwidth.

Figure 6:
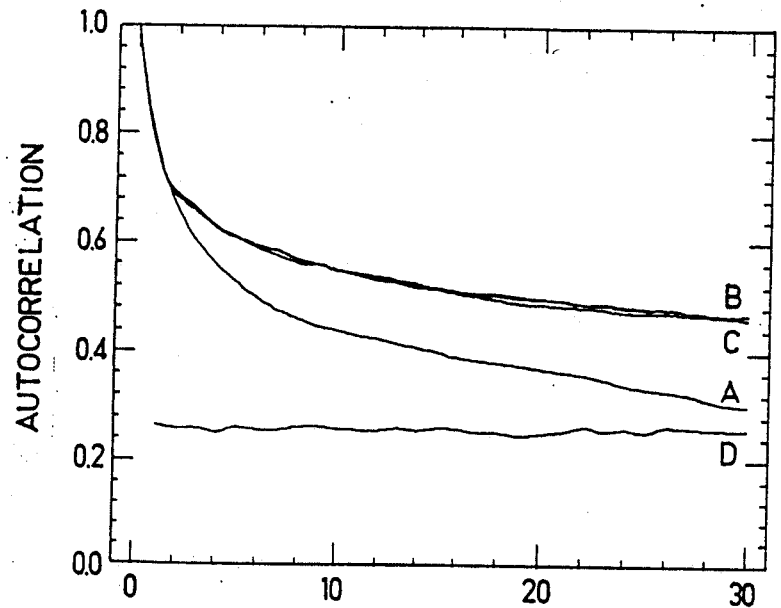
FIG. 6 is a graph showing the behavior of the autocorrelation function applied to the scrambled video signal produced by the method of FIG. 2.

In FIG. 6, this reduced bandwidth feature is represented as a graph showing the behavior of the autocorrelation function applied to the scrambled video signal produced by the inventive method. Curve A shows a typical raster scan, where the autocorrelation is low since the pixel value changes quickly as the scan is racing as fast as it can from one side of the picture to the other. In contrast, curves B and C show two scans using two different SFC's, and exhibit a higher autocorrelation among adjacent pixels. curve D shows a low autocorrelation function for a random scan, where no pixel relationship obtains.

Figure 7:
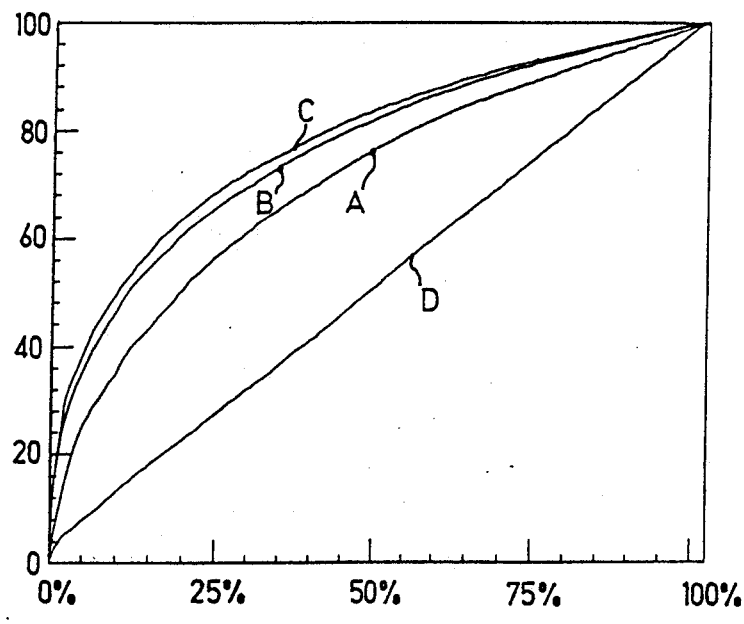
FIG. 7 is a graph comparing the normalized integral of the power spectral density produced by the scrambled video signal to that of a conventional raster scan and a random pixel permutation.
Figure 8:
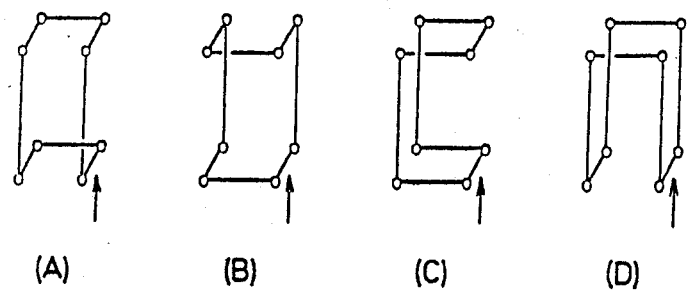

FIG. 7 is a graph comparing the normalized integral of the power spectral density produced by the scrambled video signal to that of a conventional raster scan. The bandwidths of the four scans (full bandwidth=100%) are demonstrated by showing the integrals of the power spectral densities. The integral shows the amount of power that remains in a signal after a low pass filtering is applied; therefore the higher the integral, the better the scan for bandwidth purposes. The straight line D is that of the random scan. The raster scan A has a higher power spectral density, being just above that of the random scan. But the highest power spectral densities belong to the two top curves B and C, which correspond to scan using SFC's.

Another feature of the invention is the application of the SFC to a sequence of consecutive frames in the video picture. Storage of the video information in sequential frame stores allows a three-dimensional SFC to be used since the sequence of possible locations is contained within a cubic grid built by the consecutive video frames. This further increases the security of the encryption method, since the number of possible SFC's is much higher because the third dimension provides an extra degree of freedom. It is estimated that for a 3-dimensional SFC in which each frame store contains $250 \times 250$ pixels, there are $2^{71000}$ possible variations.

To understand the approach to 3-dimensional SFC generation, there is now presented a short discussion of another method of producing two-dimensional SFC's. This method is called the tile-and-merge method, and is based on production of Hamiltonian paths by first covering all vertices of a rectangular grid graph by disjoint elementary circuits, and then merging these circuits into a single Hamiltonian circuit. For this method, some definitions are required.

Let G be an undirected graph. Consider disjoint circuits $C_1, C_2, \ldots, C_k$ that cover all the vertices of G. Two of these circuits $C_i$ and $C_j$ are defined to be neighbors if there is an edge $e_1=(v_1, v'_1)$ in $C_1$, and an edge $e_2=(v_2, v'_2)$ $(=v'_2, v_2))$ such that there are edges $f_1=(v_1, v_2)$ and $f_2=(v'_1, v'_2)$ in G. Note that $f_1$ and $f_2$ complete $e_1$ and $e_2$ into a square. If $C_i$ and $C_j$ are neighbors then they can be connected into one circuit $C_{ij}$ which covers exactly the same vertices as $C_i$ and $C_j$ by replacing $e_1$ and $e_2$ by $f_1$ and $f_2$. Denote this replacement as a legal replacement and denote ($e_1, e_2$) as a legally replaced couple (LRC) in ($C_i, C_j$). Note that between two circuits there may be several legal replacements but only one of them may be (randomly) chosen. Thus by a single legal replacement the number of circuits has been reduced by 1. Thus, if the process is started with k circuits, after $k-1$ legal replacements a Hamiltonian circuit is left. This leads directly to the following definitions and algorithm for finding a random Hamiltonian circuit in a general grid graph.

Given k disjoint circuits $C_1, C_2, \ldots, C_k$ over G, define a graph $G_k=(V_k, E_k)$ where $V_k=\{C_1, C_2, \ldots, C_k\}$ and $E_k=\{(C_i, C_j): C_i$ and $C_j$ are neighbors$\}$. For each $(C_i, C_j) \in E_k$ let the following relationship obtain for $(L_{ij})$:

$(L_{ij})^k=\{(e_1, e_2): e_1$ and $e_2$ are LRC in $(C_i, C_j)\}$.

Note that in a grid graph, edges of a legally replaced couple are adjacent edges that are located in different circuits. Denote two circuits to be external if neither of them is surrounded by the other. The circuits $C_1, C_2, \ldots, C_k$ are considered as a tile of G. If the circuits are all external in pairs then they are denoted as external circuits and the tile is denoted as an external tile.

Considering now the 3-dimensional SFC, this can be an extension of the 2-dimensional tile-and-merge method in 3 dimensions with a basic circuit as a cube of 8 vertices, and, as shown in FIGS. 8a–d, there are four possible cubic circuits. Each cube is herein referred to as $C_u$ which is a node having 6 neighbors in $G_k$-the 6 cubes which are parallel (by facets) to $C_u$. The algorithm SpanCubes is now presented for producing the 3-dimensional SFC, and contains the following steps:

1. Match pairs of parallel squares into cubes of 8 vertices.
2. Randomly choose a spanning tree T for $G_k$.
3. Randomly choose a node with degree less than 6 (in T) to be the root of T and direct all the edges of T from the root towards the leaves.
4. Scan T in a BFS (breadth first search) manner. At each visited node $C_u$, use procedure Assign (see below) to assign a circuit to the cube $C_u$ (in G) and perform a legal replacement.

Procedure Assign
1. Randomly choose one of the four possible cubic circuits.
2. According to the configuration of $C_u$, the predetermined entrance edge and the chosen cubic circuit to each outgoing edge a leaving edge.
3. Notify all the sons of $C_u$ of the respective leaving edges.

Each node is entered via one edge that will be denoted as the entrance edge and left via 0–5 edges which will be denoted as leaving edges. FIGS. 8a–d show the entrance edge as being the upper left edge of the cube. For an unlabeled cube (one that can rotate around its axis of symmetry) there is exactly one circuit that covers the cube's vertices. For a labeled cube (fixed in space) with a chosen edge (the entrance edge) there are four possible covering cubic circuits as shown in FIGS. 8a–d.

In procedure Assign, when a leaving edge $e_1$ in T towards a node $C_u$ is selected, its identity is relayed to $C_u$. The edge in $C_u$ which is near to $e_1$ (necessarily) becomes the entrance edge of $C_u$. The root's entrance node is randomly selected from a side where there is no edge in T, which is the reason for choosing a root with a degree less than 6. A node in T may have up to 5 outgoing edges and therefore there are 32 possible configurations for each node. For each cubic circuit there is at least one way to assign to each outgoing edge (in T) a leaving edge (in G). Clearly whenever assignment is done, one of the possible assignments should be randomly selected. This leads to the formal definition of procedure Assign as shown above. The terms "root", "node", "father" and "son" all refer to the spanning tree T. All edges are meant to be in G. Recall that procedure Assign is performed while visiting a node $C_u$ in T. The father of $C_u$ in T has already been visited. Initially (in algorithm SpanCubes) $C_u$ is the root of T and the entrance edge of the root is as described above.

This 3-dimensional method of producing a SFC also has advantages in further reducing the bandwidth, since the SFC exploits the interframe correlation. That is, since there is a high correlation between two pixels at the same spatial location in consecutive frames, there is frame-to-frame redundancy. The 3-dimensional SFC visits the entire volume formed by the consecutive frame stores. Thus two pixels which are 200 pixels (N=200) apart in the video signal are separated by a Euclidean distance of about 20–30 pixels ($N^{0.6}$) in the corresponding 3-dimensional block of consecutive frame stores when a three dimensional SFC is employed. Where a 2-dimensional SFC is employed, the two pixels which are 200 pixels apart would be around 50–60 pixels ($N^{0.75}$) apart in the corresponding picture. In the raster scan, 200 pixels apart in the video signal would be approximately the same in the picture. This comparison illustrates the smoothness of the video signal in the 3-dimensional case, hence the lower bandwidth.

Referring now to FIG. 9, there is shown the autocorrelation functions of a raster scan signal (A), a random 2-dimensional SFC scan signal (B) and a random 3-dimensional SFC scan signal (C). This demonstrates the improvement in performance in the 2-dimensional SFC scan signal and the further improvement in the 3-dimensional SFC scan signal over the the conventional raster scan signal.

Having described the invention in connection with certain specific embodiments thereof, it is to be understood that the description is not meant as a limitation since further modifications may now suggest themselves to those skilled in the art and it is intended to cover such modifications as fall within the scope of the apppended claims.

Algorithm HAM+ initialize: $i \leftarrow 1$.
iterate: while $i \leq (m - 2)$ do 1. while $degree(v_l) = 0$ choose $right(v_l)$ and $below(v_l)$ for connections.

{ All inevitable choices from the leftmost vertex }

2. $v_{last} \leftarrow v_l$.

3. while there exists $v_r$ do (a) If $degree(v_r) = 0$ then connect $v_r$ with $left(v_r)$ and with $below(v_r)$.

{ inevitable choice }

(b) If $degree(v_r) = 1$ then:

<u>if</u>   $left(v_r) = partner(v_r)$ or $v_r = v_{last}$ <u>then</u> connect $v_r$ with $below(v_r)$.

{ inevitable choice in order not to close a small cycle }

*else* randomly choose between left($v_r$) and *below*($v_r$) for connecting with $v_r$.

{ this is where we introduce randomness in the construction of the circuit }

4. $i \leftarrow i + 1$.

finish: Tie the paths together into a global circuit.

Procedure Tie 1. make a (left) *return* path between $v_1$ and *below*($v_1$) via the leftmost vertex of row $(m-1)$.

2. make a (right) *return* path between $v_k$ and *below*($v_k$) via the rightmost vertex of row $m$.

{ the two right most endpoints are now *below*($v_k$) and $v_{k-1}$ }

3. make a *cross* path between *below*($v_k$) and *below*($v_{k-1}$).

$i \leftarrow k - 2$.

4. { the three rightmost endpoints are now $v_{i+1}$, *below*($v_{i+1}$) and $v_i$ } while $i + 1 \neq 1$ do (a) *if* $v_{i+1}$ and *below*($v_{i+1}$) are *partners* then:

(i) make a direct path between $v_{i+1}$ and $v_i$.

(ii) make a direct path between *below*($v_{i+1}$) and *below*($v_i$).

*else if* $v_{i+1}$ and $v_i$ are *partners* then:

(i) make a (left) *return* path between $v_{i+1}$ and *below*($v_{i+1}$) via $v'$ for some $v'$ between *right*($v_i$) and $v_{i+1}$ (including them).

(ii) make a (right) *return* path between $v_i$ and *below*($v_i$) via *left*($v'$).

*else* : { $v_{i+1}$, *below*($v_{i+1}$) and $v_i$ are endpoints of different paths } randomly choose between *direct* paths or *return* paths as above.

{ the two right most endpoints are now *below*($v_i$) and $v_{i-1}$ }

(b) make a *cross* path between *below*($v_i$) and *below*($v_{i-1}$).

(c) $i \leftarrow i - 2$.

5. stop.

{ if $i + 1 = 1$ then the *cross* path was connected to *below*($v_1$) and the global circuit is achieved }

```
program ham (input,output,f);

const
        n = 256 ;
        m = 256 ;

type
        direction = ( up,down,right,left );
        vertices =
                record
                        degree : 0..2 ;
                        adjacent1,adjacent2 : direction;
                                (* the adjacent vertices *)
```

```
                    partnerline : 1..n ;
                    partnercol  : 1..m ;
                        (* the other endpoint of its path *)
            end ;
    grid = array [1..n,1..m] of vertices ;

var
        f : file of char ;

vertex : grid ;

inseed,
        t,
        last,           (* all vertices below last are handled by goingup *)
        l,c,            (* endpoint of the path *)
        i,j,            (* vertex which is currently treated *)
        miss,           (* number of missed vertices *)
        counter,            (* for the random function *)
        seed,
        aaa,
        ccc,
        mmm
            : integer ;

step : 1..2 ;   (* to next vertex in same column *)

randir : direction ;
            (* random variable for choosing the adjacent vertex *)

partners
            : boolean ;

xx
            : real ;

procedure randd (var  x:real) ;
(* ============================== *)

(*      assigns to x a value between 0 and 1    *)

begin
        seed := abs((seed * aaa + ccc) mod mmm) ;
        x := seed / mmm ;
end ;
    procedure choosedir(var      dir : direction) ;
(* ================================================ *)

var
        x : real ;

begin
        randd(x) ;
        if x< 0.6 then
                    dir := down
               else
                    dir := right ;
end ;

procedure choose  (var    r: integer; i,j: integer ) ;
(* =========================================================== *)

(* choose a random number r between i and j *)

var
        x : real ;

begin
        randd(x) ;
        r := round(x * (j-i) ) + i ;
end ;
```

```
    procedure goingup ;
(* ================== *)

var
        i : integer ;

begin
        i := n ;
        while ((i>0) and (vertex[i,j].degree=0)) do
        begin
                with vertex[i,j] do
                begin
                        adjacent1 := right ;         (* i,j+1 *)
                        adjacent2 := up    ;         (* i-1,j *)
                end ;
                with vertex[i-1,j] do                (* with the upper *)
                begin
                        if degree=0 then             (* not visited before *)
                        begin
                                adjacent1 := down ;   (* i,j *)
                                degree := 1 ;
                                l:=i-1 ; c:=j ;  (* this is the end point *)
                                step := 1 ;      (* visit again this vertex *)
                        end
                        else begin                    (* was visited before *)
                                adjacent2 := down ;   (* i,j *)
                                l := partnerline ;
                                c := partnercol  ;
                                        (* this is the path's endpoint *)
                                step := 2 ;      (* skip this vertex *)
                        end;
                end;
                with vertex[l,c] do                  (* update the endpoint *)
                begin
                        partnerline := i ;
                        partnercol  := j+1 ;
                                (* the right one is the other endpoint *)
                end;
                with vertex[i,j+1] do                (* update the right one *)
                begin
                        adjacent1 := left ;     (* i,j *)
                        degree := 1 ;     (* indicating it has been visited *)
                        partnerline := l ;
                        partnercol  := c ;
                                        (* the other endpoint *)
                end ;
                i := i-step ;   (* continue with next vertex incolumn *)
        end ;
        last := i ;
                (* last vertex to be handled when moving down *)

end ;   (* of going up *)

procedure takeboth ;
(* ================== *)

begin
        with vertex[i,j] do
        begin
                adjacent1 := right ;         (* i,j+1 *)
                adjacent2 := down  ;         (* i+1,j *)
        end ;
        with vertex[i+1,j] do                (* with the 'down' vertex *)
        begin
                if degree=0 then             (* not visited before *)
                begin
                        adjacent1 := up ;     (* i,j *)
                        degree := 1 ;
                        l:=i+1 ; c:=j ;       (* this is the end point *)
                        step := 1 ;           (* visit again this vertex *)
```

```
                    end
                else begin                          (* was visited before *)
                        adjacent2 := up ;                   (* i,j *)
                        l := partnerline ;
                        c := partnercol ;
                                            (* this is the path's endpoint *)
                                step := 2 ;         (* skip this vertex *)
                end;
        end;
        with vertex[l,c] do                         (* update the endpoint *)
        begin
                partnerline := i ;
                partnercol  := j+1 ;
                            (* the right one is the other endpoint *)
        end;
        with vertex[i,j+1] do            (* update the right one *)
        begin
                adjacent1 := left ;               (* i,j *)
                degree := 1 ;            (* indicating it has been visited *)
                partnerline := l ;
                partnercol  := c ;
                                         (* the other endpoint *)
        end ;

end ;   (* of takeboth *)

procedure takedown ;
(* =================== *)

begin
        with vertex[i,j] do
                adjacent2 := down ;             (* i+1,j *)
        with vertex[i+1,j] do            (* with the 'down' vertex *)
        begin
                if degree=0 then            (* not visited before *)
                 begin
                        adjacent1 := up ;         (* i,j *)
                        degree := 1 ;
                        l:=i+1 ; c:=j ;          (* this is the end point *)
                        step := 1 ;              (* visit again this vertex *)
                end
                else begin                        (* was visited before *)
                        adjacent2 := up ;                  (* i,j *)
                        l := partnerline ;
                        c := partnercol ;
                                            (* this is the path's endpoint *)
                                step := 2 ;         (* skip this vertex *)
                end;
        end;
        with vertex[l,c] do                         (* update the endpoint *)
        begin
                partnerline := vertex[i,j].partnerline ;
                partnercol  := vertex[i,j].partnercol ;
                                            (* the other endpoint *)
        end;
        with vertex[vertex[i,j].partnerline,vertex[i,j].partnercol] do
        begin                            (* update the other endpoint *)
                partnerline := l ;
                partnercol  := c ;
                                         (* the other endpoint *)
        end ;

end ;   (* of takedown *)

procedure takeright ;
(* ==================== *)

begin
        with vertex[i,j] do
                adjacent2 := right ;            (* i,j+1 *)
        with vertex[i,j+1] do            (* with the vertex on the right *)
```

```
                begin
                        adjacent1 := left ;             (* i,j *)
                        degree := 1 ;
                        step := 1 ;                     (* visit again this vertex *)
                        partnerline := vertex[i,j].partnerline ;
                        partnercol  := vertex[i,j].partnercol  ;

(* the other endpoint *)
                end;
                with vertex[vertex[i,j].partnerline,vertex[i,j].partnercol] do
                begin                                   (* update the other endpoint *)
                        partnerline := i ;
                        partnercol  := j+1 ;
                                                        (* the other endpoint is the right *)
                end ;

end ;     (* of takeright *)

procedure bottom ;
(* ----------------- *)

begin
        vertex[n,m-1].adjacent2 := right ;
        vertex[n,m].adjacent2 := left ;

i := n ;
        while vertex[i,m-1].degree =0 do
        begin
                vertex[i,m-1].adjacent1 := up ;
                vertex[i,m].adjacent1 := up ;
                vertex[i-1,m-1].adjacent2 := down ;
                vertex[i-1,m].adjacent2 := down ;
                i := i-1 ;
        end ;
        last := i ;

with vertex[last,m] do           (* make it compatible with *)
        begin                                    (* the coming snake *)
                if (i=n) then
                        adjacent1 := left
                else
                        adjacent1 := down ;

adjacent2 := up ;
        end ;

(* update partners :      *)
        l := vertex[last,m-1].partnerline ;
        c := vertex[last,m-1].partnercol  ;
                                         (* (l,c) is partner of (last,m-1) *)
        vertex[last,m].partnerline := l ;
        vertex[last,m].partnercol  := c ;
                                (* make (l,c) a partner of (last,m) *)
        vertex[l,c].partnerline := last ;
        vertex[l,c].partnercol  := m    ;
                                (* make (last,m) a partner of (l,c) *)
```

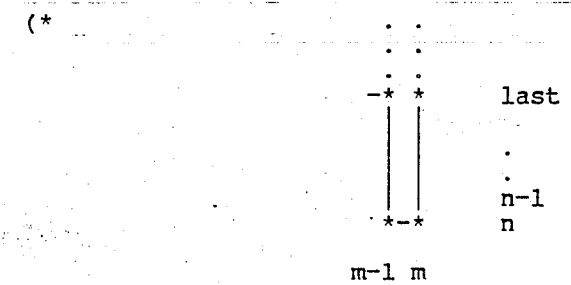

```
end ;   (* of bottom *)
```

```
    procedure top ;
(* ============ *)

begin
        vertex[1,m-1].adjacent2 := right ;
        vertex[1,m].adjacent2 := left ;

i :=1 ;
        while vertex[i,m-1].degree =0 do
        begin
                vertex[i,m-1].adjacent1 := down ;
                vertex[i,m].adjacent1 := down ;
                vertex[i+1,m-1].adjacent2 := up ;
                vertex[i+1,m].adjacent2 := up ;
                i := i+1 ;
        end ;

l := vertex[i,m-1].partnerline ;
        c := vertex[i,m-1].partnercol  ;
                                (*      (l,c) is partner of (i,m-1)    *)
        vertex[i,m].partnerline := l ;
        vertex[i,m].partnercol  := c ;
                                (*      make (l,c) partner of (i,m)    *)
        vertex[l,c].partnerline := i ;
        vertex[l,c].partnercol  := m ;
                                (*      make (i,m) partner of (l,c)    *)

(            m-1 m

*-* 1
              | | 2
              | | 3
                 .
              -* *  i
                 .
                 . .
                 . .

*)

end ;   (* end of top *)

procedure snake ;
(* =============== *)

var
        stoploop : boolean ;

begin
        l := vertex[i,m].partnerline ;
        c := vertex[i,m].partnercol  ;   (* (l,c) is a partner of (i,m) *)

vertex[i,m].adjacent1 := down ;
        vertex[i+1,m].adjacent2 := up ;

i := i+1 ;
        stoploop := false ;

while ((vertex[i,m-1].degree=0) and (i<n) and not(stoploop)) do
        begin
          if (vertex[i+1,m-1].degree=0) then
          begin
                vertex[i,m].adjacent1 := left ;
                vertex[i,m-1].adjacent1 := right ;
                vertex[i,m-1].adjacent2 := down ;
                vertex[i+1,m-1].adjacent1 := up ;
                vertex[i+1,m-1].adjacent2 := right ;
                vertex[i+1,m].adjacent1 := left ;
                vertex[i+1,m].adjacent2 := down ;
                vertex[i+2,m].adjacent2 := up ;
                i := i+2 ;
```

```
        end else
                stoploop := true ;

end ;

if vertex[i,m-1].degree = 0 then
        begin
                vertex[i,m].adjacent1 := down ;
                                        (* mark the missed vertex *)
                vertex[i+1,m].adjacent2 := up ;

miss := miss+1 ;
                i := i+1 ;
        end ;
(*                              make (1,c) and (i,m) partners   *)
        vertex[i,m].partnerline := 1 ;
        vertex[i,m].partnercol  := c ;

vertex[1,c].partnerline := i ;
        vertex[1,c].partnercol  := m ;

(*
                        (2)
                 *1* *
                     |
                 *-*
                 |
                 *-*
                    |
                 *-*
                 |
                 *-*
                    |
                 ?  *
                    |
                 *-* *

*)
end ;    (* of snake *)

(*
                  . *
                  . |
               *-A  B .              - a
                  . .
                  . .
                  . .
               *-C  .
                  .
*)

procedure straight ;
(* ================== *)

var
        la,ca,lb,cb,lc,cc,
        a,       (* line of A and B *)
        x1       (* random variable for choosing the bridge's line *)
           : integer ;
begin
        a := i ;
        la := vertex[a,m-1].partnerline ;
        ca := vertex[a,m-1].partnercol  ;
                                        (* (la,ca) is the partner of A *)
        lb := vertex[a,m].partnerline ;
        cb := vertex[a,m].partnercol  ;
                                        (* (lb,cb) is the partner of B *)
```

```
        vertex[a,m].adjacent1 := down ;             (*         (2)    *)
                                                    (*    (1)A  B    *)
        vertex[a,m-1].adjacent2 := down ;           (*       2  1    *)
                                                    (*       |  |    *)
        vertex[a+1,m].adjacent2 := up ;             (*       |  |    *)
                                                    (*       2  2    *)
        vertex[a+1,m-1].adjacent2 := up ;           (*       A  B    *)

i := a+1 ;
        while vertex[i,m-1].degree = 0 do
        begin
                vertex[i,m].adjacent1 := down ;     (*        (2)(2) *)
                                                    (*        A  B   *)
                vertex[i,m-1].adjacent1:= down;     (*        1  1   *)
                                                    (*        |  |   *)
                vertex[i+1,m].adjacent2:= up ;      (*        2  2   *)
                                                    (*        A  B   *)
                vertex[i+1,m-1].adjacent2:= up ;    (*        1  1   *)
                                                    (*        |  |   *)
                i := i+1 ;                          (*        2  2   *)
        end ;                                       (*    (1)C  D    *)
(*
```

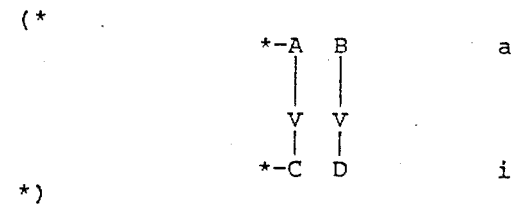

```
*)

lc := vertex[i,m-1].partnerline ;
        cc := vertex[i,m-1].partnercol ;
                                (* (lc,cc) is the partner of C *)

choosedir(randir) ;     (* randomly choose direction of connection *)

if ( ( ((la=a) and (ca=m))           (* B is the partner of A *)
                    or
                  ( randir = down ) )
              and
                ( (la<>i) or (ca<>m-1) ) )   (* C is not the partner of A *)
        then
                        (* connect A and C  DIRECTLY  *)
        begin
                if ((la=a) and (ca=m)) then
(*              if B is the partner of A :                              *)
                begin
(*                      make D and 'partner of C' partners :            *)

vertex[i,m].partnerline := lc ;
                        vertex[i,m].partnercol  := cc ;
(*                              make (lc,cc) partner of D               *)

vertex[lc,cc].partnerline := i ;
                        vertex[lc,cc].partnercol  := m ;
(*                              make D partner of (lc,cc)               *)
                end
                else begin
(*                      make 'partner of B' and D   partners :          *)

vertex[i,m].partnerline := lb ;
                        vertex[i,m].partnercol  := cb ;
(*                              make (lb,cb) partner of D               *)

vertex[lb,cb].partnerline := i ;
                        vertex[lb,cb].partnercol  := m ;
(*                              make D partner of (lb,cb)               *)

(*              make 'partner of A' and 'partner of C'  partners :      *)
```

```
                        vertex[lc,cc].partnerline := la ;
                        vertex[lc,cc].partnercol  := ca ;
(*                                  make (la,ca) partner of (lc,cc) *)

vertex[la,ca].partnerline := lc ;
                        vertex[la,ca].partnercol  := cc ;
(*                                  make (lc,cc) partner of (la,ca) *)

end;
        end
        else begin
                        (* connect A and B via a BRIDGE *)

(* because C is partner of A or 'right' is chosen *)

choose (x1,a,i-1) ;
                (* randomly choose a line x1 between a and i-1 for the bridge *)

if (x1 = a) then vertex[x1,m-1].adjacent2 := right
                          else vertex[x1,m-1].adjacent1 := right ;

vertex[x1,m].adjacent1   := left ;
                vertex[x1+1,m-1].adjacent2 := right ;
                vertex[x1+1,m].adjacent2 := left ;
                vertex[x1+1,m].adjacent1 := down ;

if ((la=i) and (ca=m-1)) then
(*              if C is the partner of A :                              *)
                begin (*                      make D and 'partner of B' partners :            *)

vertex[i,m].partnerline := lb ;
                        vertex[i,m].partnercol  := cb ;
(*                                  make (lb,cb) partner of D           *)

vertex[lb,cb].partnerline := i ;
                        vertex[lb,cb].partnercol  := m ;
(*                                  make D partner of (lb,cb)           *)
                end
                else begin (*                      make 'partner of C' and D   partners :          *)

vertex[i,m].partnerline := lc ;
                        vertex[i,m].partnercol  := cc ;
(*                                  make (lc,cc) partner of D           *)

vertex[lc,cc].partnerline := i ;
                        vertex[lc,cc].partnercol  := m ;
(*                                  make D partner of (lc,cc)           *)

(*                      make 'partner of A' and 'partner of B' partners : *)

vertex[lb,cb].partnerline := la ;
                        vertex[lb,cb].partnercol  := ca ;
(*                                  make (la,ca) partner of (lb,cb) *)

vertex[la,ca].partnerline := lb ;
                        vertex[la,ca].partnercol  := cb ;
(*                                  make (lb,cb) partner of (la,ca) *)

end ;

(*
```

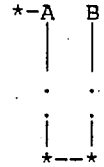

```
                                                        - X1
```

```
                 X   X              delete the edges
                 *---*              - X1+1
                 |   |
                 .   .
                 .   .
                 |   |
                 *-C  D             - i
*)

end ;    (* of BRIDGE *)

end ;            (* of straight *)

procedure finish ;
(* =============== *)

begin
        miss := 0 ;
        bottom ;
        top ;
        snake ;
        while i<last do
        begin
                straight;
                snake ;
        end ;
end ;

procedure writefile ;
(* =================== *)

var
        i,j,d,u,r,l,p :integer ;
        camefrom,dir1,dir2,dirtemp : direction ;

begin
        rewrite(f) ;            (* make file 'f' ready to accept data *)
        i := 1 ;
        j := 1 ;

p := 1 ;

camefrom := down ;

repeat
                with vertex[i,j] do
                begin
                        d:=0; u:=0; r:=0; l:=0;
                        dir1 := adjacent1 ;
                        dir2 := adjacent2 ;

if (dir1 <> camefrom) then
                        begin
                                dirtemp := dir2 ;
                                dir2 := dir1 ;
                                dir1 := dirtemp ;
                        end ;
(*                              came from dir1 and going to dir2            *)

case dir2 of
                                down : begin
                                        d := 1 ;
                                        write(f,'d') ;
                                        camefrom := up ;
                                end ;
```

```
                             left : begin
                                         l := 1 ;
                                         write(f,'l') ;
                                         camefrom := right ;
                                    end ;

up   : begin
                                         u := 1 ;
                                         write(f,'u') ;
                                         camefrom := down ;
                                    end ;

right: begin
                                         r := 1 ;
                                         write(f,'r') ;
                                         camefrom := left ;
                                    end ;
                        end;

j := j + r - l ;
                        i := i + d - u ;

end ;   (* of with *)

until  ((i=1) and (j=1)) ;

reset(f) ;

end ;

procedure refreshmemory ;
(* ===================== *)

var
        i, j    : integer ;

begin
        for i:=1 to n do
                for j:=1 to m do
                        with vertex[i,j] do
                        begin
                                degree := 0 ;

end ;
end ;

procedure buildcolumn ;
(* ===================== *)

begin
        goingup ;
        i := 1 ;
        while i<last do
        begin
                with vertex[i,j] do
                case degree of
                        0 : takeboth ;
                        1 : begin
                                partners := ((partnerline = i+1) and
                                             (partnercol = j)) ;
                                if partners then
                                              randir := right
                                else
                                              choosedir(randir) ;
                                     (* randomly choose  *)

if (randir=right) then takeright
                                                  else takedown ;
                            end ;
```

```
              end ;
              i := i+step ;
                         (* continue with next vertex incolumn *)
        end ;
        if (i=last) then takeright ;
end ;

begin    (* main ham *)

seed := 7774755 ;
aaa  := 62605 ;
ccc  := 113218009 ;
mmm  := 536870912 ;

readln(inseed) ;
for t:=1 to inseed do randd(xx) ;

refreshmemory ;
        counter := 1 ;
        for j:=1 to m-2 do
                buildcolumn ;             (* build column j *)
        j := m-2 ;
        finish ;                 (* finish the last 2 columns *)
        writefile ;
end .
```

I claim:

1. A method of encrypting a video signal comprising the steps of:
   storing in the locations of a frame buffer the pixel values of a group of video information lines representing at least a portion of a video picture contained in the video signal;
   defining a pseudo-random Space Filling Curve (SFC), being a Hamiltonian path and providing a sequence corresponding to locations of the frame buffer mapping random directions of movement between adjacent pixels of the video picture portion; and
   addressing the locations of the frame buffer in accordance with the defined sequence to read the pixel values thereof for encrypted transmission of the video signal.

2. The method of claim 1 wherein said frame buffer forms an element of a video scrambler which generates said SFC and addresses said frame buffer location in accordance therewith.

3. The method of claim 1 wherein said SFC is a Hamiltonian path which visits substantially all the pixels in the video picture exactly once by movement between adjacent pixels.

4. The method of claim 2 wherein said SFC is a Hamiltonian path which visits substantially all the pixels in the video picture exactly once by movement between adjacent pixels.

5. The method of claim 1 wherein said SFC provides mapping of at least two of vertical, horizontal and diagonal random directions of movement between substantially all adjacent pixels of the video picture portion.

6. The method of claim 2 wherein the encryption provided by said video scrambler in the transmission of the video signal is decoded by a descrambler by use of a shared key stream between said scrambler and descrambler, such that the latter generates the same pseudo-random SFC as is used in said scrambler, thereby providing it with the correct sequence with which to write the video signal into the locations of a frame buffer included therein for restoring the original video signal.

7. The method of claim 3 wherein the encryption provided by said video scrambler in the transmission of the video signal is decoded by a descrambler by use of a shared key stream between said scrambler and descrambler, such that the latter generates the same pseudo-random SFC as is used in said scrambler, thereby providing it with the correct sequence with which to write the video signal into the locations of a frame buffer included therein for restoring the original video signal.

8. The method of claim 4 wherein the encryption provided by said video scrambler in the transmission of the video signal is decoded by a descrambler by use of a shared key stream between said scrambler and descrambler, such that the latter generates the same pseudo-random SFC as is used in said scrambler, thereby providing it with the correct sequence with which to write the video signal into the locations of a frame buffer included therein for restoring the original video signal.

9. The method of claim 5 wherein the encryption provided by said video scrambler in the transmission of the video signal is decoded by a descrambler by use of a shared key stream between said scrambler and descrambler, such that the latter generates the same pseudo-random SFC as is used in said scrambler, thereby providing it with the correct sequence with which to write the video signal into the locations of a frame buffer included therein for restoring the original video signal.

10. The method of claim 2 wherein the encryption provided by said video scrambler in the transmission of the video signal is decoded by a descrambler which has stored therein a plurality of SFC's from which a selection is made in accordance with a signal indicating the SFC being used in the scrambler, thereby providing the descrambler with the correct sequence with which to write the video signal into the locations of a frame buffer included therein for restoring the original video signal.

11. The method of claim 3 wherein the encryption provided by said video scrambler in the transmission of the video signal is decoded by a descrambler which has stored therein a plurality of SFC's from which a selection is made in accordance with a signal indicating the SFC being used in the scrambler, thereby providing the descrambler with the correct sequence with which to write the video signal into the locations of a frame buffer included therein for restoring the original video signal.

12. The method of claim 4 wherein the encryption provided by said video scrambler in the transmission of the video signal is decoded by a descrambler which has stored therein a plurality of SFC's from which a selection is made in accordance with a signal indicating the SFC being used in the scrambler, thereby providing the descrambler with the correct sequence with which to write the video signal into the locations of a frame buffer included therein for restoring the original video signal.

13. The method of claim 5 wherein the encryption provided by said video scrambler in the transmission of the video signal is decoded by a descrambler which has stored therein a plurality of SFC's from which a selection is made in accordance with a signal indicating the SFC being used in the scrambler, thereby providing the descrambler with the correct sequence with which to write the video signal into the locations of a frame buffer included therein for restoring the original video signal.

14. The method of claim 2 wherein the SFC used for encryption in said video scrambler is included in the transmission of the video signal for use by a descrambler, such that the latter is provided with the correct sequence with which to write the video signal into the locations of a frame buffer included therein, for restoring the original video signal.

15. The method of claim 3 wherein said pseudo-random SFC is generated by execution of an algorithm whose output domain is a family of said Hamiltonian paths in the rectangular grid graph provided by said scrambler frame buffer, with said SFC being chosen from said Hamiltonian path family and used to define the sequence in which said scrambler frame buffer addresses are read.

16. The method of claim 15 wherein after a predetermined period of time, the original SFC is replaced by another SFC from the Hamiltonian family.

17. The method of claim 1 wherein the bandwidth of the video signal is reduced and said SFC preserves the correlation between adjacent pixels of the video picture.

18. The method of claim 1 wherein the said SFC is applied to a sequence of consecutive frames in the video picture, providing a three-dimensional sequence of possible frame buffer locations within a cubic grid built by the consecutive video frames.

19. A video scrambling system incorporating the method of claim 1.

* * * * *